US008386076B2

(12) United States Patent
Honda et al.

(10) Patent No.: US 8,386,076 B2
(45) Date of Patent: Feb. 26, 2013

(54) LEGGED ROBOT AND ITS CONTROL METHOD

(75) Inventors: Daisaku Honda, Kasugai (JP); Keisuke Suga, Nishikamo-gun (JP); Ryosuke Tajima, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 923 days.

(21) Appl. No.: 12/209,444

(22) Filed: Sep. 12, 2008

(65) Prior Publication Data
US 2009/0069941 A1 Mar. 12, 2009

(30) Foreign Application Priority Data

Sep. 12, 2007 (JP) ................. 2007-237039

(51) Int. Cl.
*G06F 19/00* (2006.01)
(52) U.S. Cl. ........ 700/245; 700/251; 700/253; 700/258; 700/260; 700/261; 318/568.12; 318/568.13; 180/8.6; 180/8.5
(58) Field of Classification Search .................. 700/258, 700/245, 251, 253, 260, 261; 318/568.12, 318/568.16; 180/8.5, 8.6
See application file for complete search history.

(56) References Cited

U.S. PATENT DOCUMENTS

| | | | | |
|---|---|---|---|---|
| 6,301,524 B1 * | 10/2001 | Takenaka | | 700/245 |
| 6,580,969 B1 * | 6/2003 | Ishida et al. | | 700/245 |
| 6,802,382 B2 * | 10/2004 | Hattori et al. | | 180/8.6 |
| 6,876,903 B2 * | 4/2005 | Takenaka | | 700/245 |
| 6,898,485 B2 * | 5/2005 | Kuroki et al. | | 700/245 |
| 6,961,640 B2 * | 11/2005 | Kuroki et al. | | 700/245 |
| 7,053,577 B2 * | 5/2006 | Nagasaka | | 318/568.12 |
| 7,057,367 B2 * | 6/2006 | Furuta et al. | | 318/568.12 |
| 7,061,200 B2 * | 6/2006 | Iribe | | 318/568.16 |
| 7,072,740 B2 * | 7/2006 | Iribe et al. | | 700/245 |
| 7,228,923 B2 * | 6/2007 | Takenaka et al. | | 180/8.6 |
| 7,278,501 B2 * | 10/2007 | Mori et al. | | 180/8.5 |
| 7,313,463 B2 * | 12/2007 | Herr et al. | | 700/245 |
| 7,383,717 B2 * | 6/2008 | Kawaguchi et al. | | 73/1.15 |
| 7,400,939 B2 * | 7/2008 | Nagasaka | | 700/245 |
| 7,482,775 B2 * | 1/2009 | Zaier | | 318/568.12 |
| 7,649,331 B2 * | 1/2010 | Hosoda et al. | | 318/568.12 |
| 7,657,345 B2 * | 2/2010 | Endo et al. | | 700/249 |
| 7,805,218 B2 * | 9/2010 | Nagasaka | | 700/245 |
| 7,881,824 B2 * | 2/2011 | Nagasaka et al. | | 700/260 |

(Continued)

FOREIGN PATENT DOCUMENTS

| | | |
|---|---|---|
| JP | 2004-167676 A | 6/2004 |
| JP | 2006-212736 A | 8/2006 |

*Primary Examiner* — Thomas Black
*Assistant Examiner* — Wae Louie
(74) *Attorney, Agent, or Firm* — Kenyon & Kenyon LLP

(57) ABSTRACT

There is provided a legged robot that performs motion by changing a joint angle, which includes a trajectory generating section to calculate a center-of-gravity trajectory in designated stepping motion from the stepping motion including at least one of walking motion, running motion and stopping motion, and generate a center-of-gravity trajectory by superimposing a designated travel velocity onto a travel velocity of a center of gravity in the calculated center-of-gravity trajectory in stepping motion, and a trajectory updating section to store the generated center-of-gravity trajectory and update all the stored center-of-gravity trajectories so as to be continuous, and a trajectory reproducing section to calculate time-varying data of a target value of the joint angle based on the updated center-of-gravity trajectory, and a joint driving section to rotate a joint of the legged robot based on the calculated time-varying data of a target value of the joint angle.

12 Claims, 8 Drawing Sheets

U.S. PATENT DOCUMENTS

| | | | | |
|---|---|---|---|---|
| 7,942,221 | B1* | 5/2011 | Tilden | 180/8.6 |
| 7,949,428 | B2* | 5/2011 | Endo et al. | 700/245 |
| 8,060,253 | B2* | 11/2011 | Goswami et al. | 700/250 |
| 2004/0044440 | A1* | 3/2004 | Takenaka | 700/245 |
| 2005/0113973 | A1* | 5/2005 | Endo et al. | 700/245 |
| 2005/0234593 | A1* | 10/2005 | Goswami et al. | 700/245 |
| 2007/0016329 | A1* | 1/2007 | Herr et al. | 700/250 |
| 2009/0069940 | A1* | 3/2009 | Honda et al. | 700/258 |
| 2009/0069941 | A1* | 3/2009 | Honda et al. | 700/258 |
| 2012/0035762 | A1* | 2/2012 | Goswami et al. | 700/245 |

\* cited by examiner

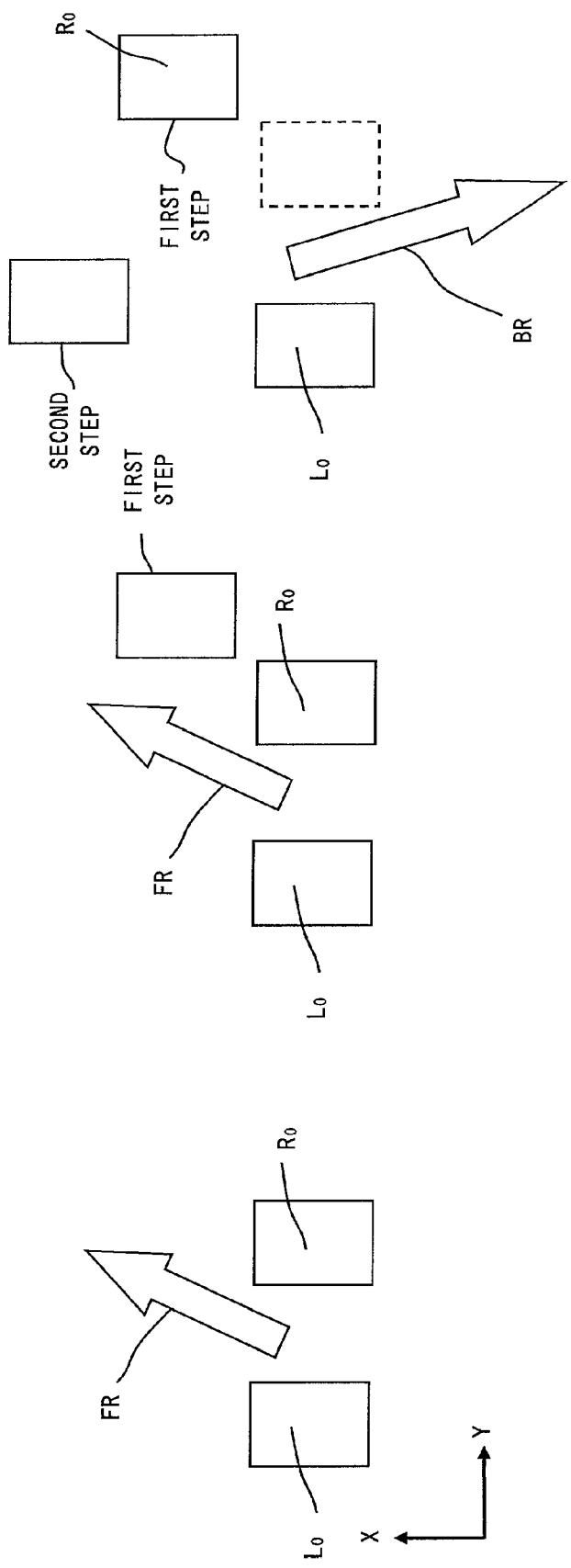

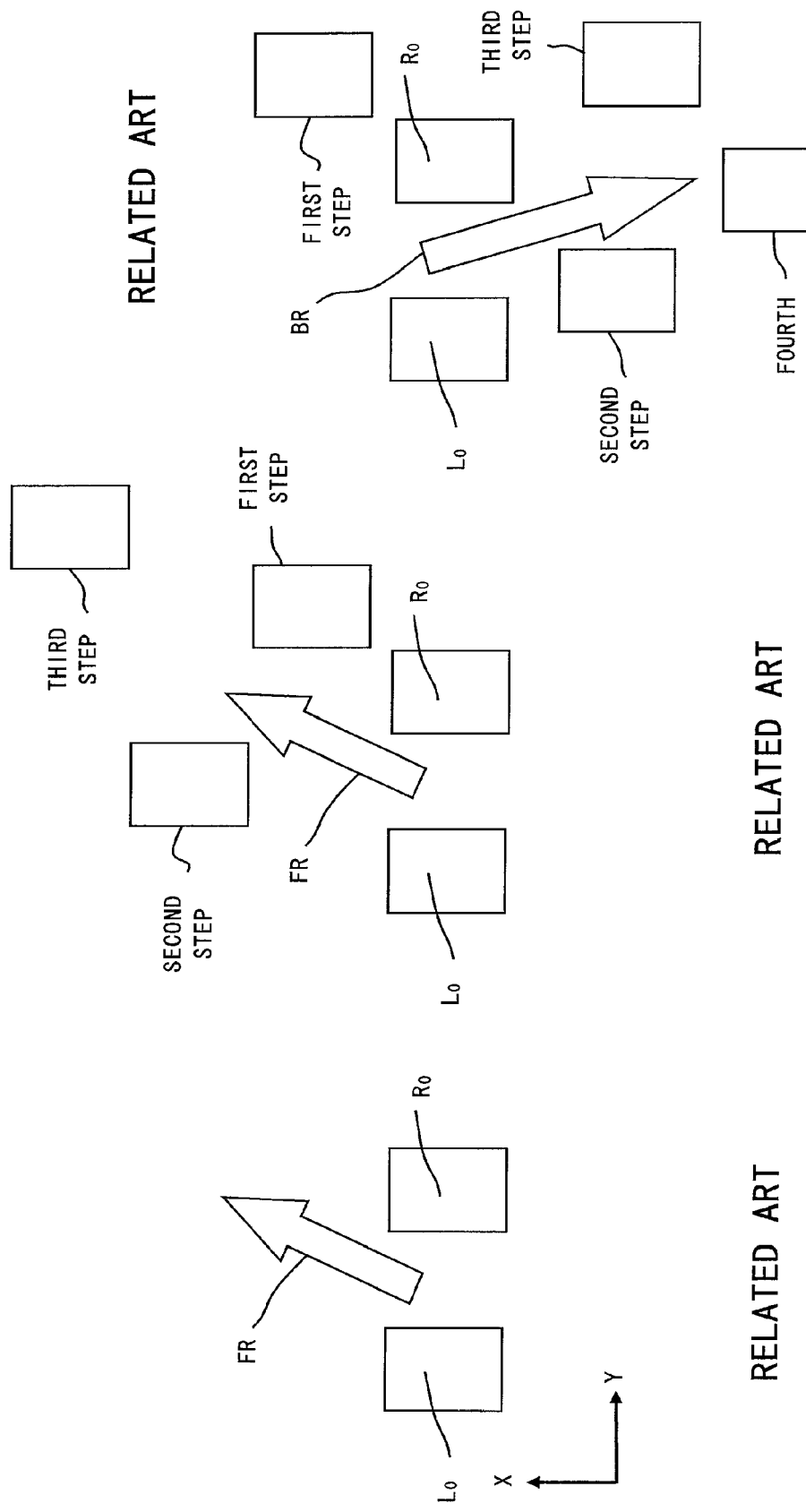

LEGGED ROBOT AND ITS CONTROL METHOD

BACKGROUND OF THE INVENTION

1. Field of the Invention

The present invention relates to a legged robot that performs motion by changing a joint angle and its control method.

2. Description of Related Art

Various techniques have been proposed for generating a walking trajectory of a legged walking robot. As one technique of generating a walking trajectory of a legged walking robot, a technique of generating walking motion of a robot by designating the vertical movement of the center of gravity to thereby calculate an optimum landing position with no falling down in real time is known (e.g. Japanese Unexamined Patent Application Publication Nos. 2006-212736 and 2004-167676). In this description, the term "trajectory" refers to data that describes a change in position over time.

The technique of the related art as described in Japanese Unexamined Patent Application Publication No. 2006-212736, for example, designates the landing positions of the foot for a plurality of number of steps in advance and generates a trajectory so as to reach the designated landing positions with regard to trajectory data of the next motion interval to be given to a robot. The technique then acquires a trajectory for the first step from the trajectory for a plurality of number of steps and supplies it to the robot. In the generation of the trajectory, the trajectory of the center of gravity is generated so that a ZMP (zero moment point) that is calculated by a ZMP equation coincides with a target ZMP. The trajectory data of one step designates condition of the translational velocity of the center of gravity as boundary condition for each step so that the trajectory is continuous with respect to the current state (a center-of-gravity position, a travel velocity etc.) of the robot.

However, the related art described in Japanese Unexamined Patent Application Publication No. 2006-212736 or the like discloses nothing about the way of designating velocity boundary condition in one-step interval for various walking and running patterns. The velocity boundary condition should be such that the center of gravity position and the target ZMP position (grounding position) that are obtained as a result of solving the ZMP equation under the designated velocity boundary condition are realizable.

For example, in the case of performing on-the-spot stepping motion, it is not always clear what value should be preset for the velocity condition of the center of gravity, and therefore only the previously regulated limited pattern can be realized. Further, the related art discloses nothing about the configuration that enables generation of walking and running trajectories in real time with the use of a technique of determining the velocity boundary condition of a one-step trajectory.

As described in the foregoing, it has been difficult to generate trajectory data by setting adequate velocity boundary condition in advance for various walking and running patterns, and the related art can only realize the previously regulated limited pattern.

SUMMARY OF THE INVENTION

In light of the foregoing, it is desirable to provide a legged robot and its control method capable of generating various motion patterns flexibly.

According to an embodiment of the present invention, there is provided a legged robot that performs motion by changing a joint angle, which includes a trajectory generating section to calculate a center-of-gravity trajectory in designated stepping motion from the stepping motion including at least one of walking motion, running motion and stopping motion, and generate a center-of-gravity trajectory by superimposing a designated travel velocity onto a travel velocity of a center of gravity in the calculated center-of-gravity trajectory in stepping motion, and a trajectory updating section to store the generated center-of-gravity trajectory and update all the stored center-of-gravity trajectories so as to be continuous, and a trajectory reproducing section to calculate time-varying data of a target value of the joint angle based on the updated center-of-gravity trajectory, and a joint driving section to rotate a joint of the legged robot based on the calculated time-varying data of a target value of the joint angle.

Calculating the trajectory (the center of gravity position and the leg tip position and posture) in stepping motion in this way enables easy creation of a model of stable trajectory data, and superimposing a travel velocity onto the calculated stepping trajectory to deform it enables generation of a desired one-step trajectory according to the travel velocity. It is thereby possible to flexibly generate various motion patterns.

The trajectory generating section may generate the center-of-gravity trajectory by acquiring a designated portion of the calculated center-of-gravity trajectory in stepping motion and superimposing the designated travel velocity onto a travel velocity of a center of gravity in the acquired trajectory. By acquiring and deforming a designated portion of the stepping trajectory, it is possible to flexibly generate trajectory data for a desired unit.

Further, the designated portion of the stepping trajectory may be a one-step trajectory of the legged robot. By acquiring and deforming the designated portion of the stepping trajectory, it is possible to flexibly generate desired trajectory data for the next one step.

Each motion included in the stepping motion may contain data such as a target ZMP trajectory, a period of motion, a sequence of lifting a foot and a grounding position of a foot tip.

The trajectory generating section may calculates a center-of-gravity trajectory in stepping motion by solving simultaneous equations established among a matrix containing a coefficient calculated based on a vertical center-of-gravity trajectory, a column of horizontal center-of-gravity trajectory, and a column of target ZMP.

The matrix may be a matrix containing the coefficient calculated based on the vertical trajectory so that an equation related to a first element in the column of target ZMP involves a last element in the column of center-of-gravity trajectory, and an equation related to a last element in the column of target ZMP involves a first element in the column of center-of-gravity trajectory. By executing trajectory generation processing under periodic boundary condition, it is possible to generate the trajectory without specifying velocity boundary condition in advance.

The trajectory updating section may calculate a center-of-gravity trajectory by solving simultaneous equations established among a tridiagonal matrix containing a coefficient calculated based on a vertical center-of-gravity trajectory, a column of horizontal center-of-gravity trajectory, and a column of distance calculated from a target ZMP and a travel velocity. the trajectory updating section calculates a center-of-gravity trajectory by solving simultaneous equations established among a tridiagonal matrix containing a coefficient calculated based on a vertical center-of-gravity trajectory, a column of horizontal center-of-gravity trajectory, and a column of distance calculated from a target ZMP and a travel velocity. For the simultaneous equations that are expressed using the tridiagonal matrix, a technique of obtaining a solution at high speed with a small calculation load has been developed. It is thereby possible to calculate the center-of-gravity trajectory at high speed with a small calculation load.

If a center-of-gravity trajectory stored in the trajectory reproducing section becomes equal to or less than a predetermined time interval, the trajectory reproducing section may requests a center-of-gravity trajectory to the trajectory updating section. Further, the trajectory updating section stores a center-of-gravity trajectory of a plurality of number of steps and, if the stored center-of-gravity trajectory becomes equal to or less than a predetermined time interval, the trajectory updating section may request generation of a center-of-gravity trajectory to the trajectory generating section. Furthermore, if the trajectory generating section receives a request for generation of a center-of-gravity from the trajectory updating section, the trajectory generating section may generate a center-of-gravity trajectory in stepping motion. By storing a center-of-gravity trajectory of a plurality of number of steps in the trajectory updating section and, when a request for the next one-step trajectory is made by the trajectory reproducing section and if the center-of-gravity trajectory stored in the trajectory updating section becomes equal to or less than a predetermined time interval, requesting generation of a center-of-gravity trajectory to the trajectory generating section, it is possible to reserve trajectory generation processing until immediately before the time when the next one-step trajectory is needed, thereby executing the trajectory generation processing in real time.

According to another embodiment of the present invention, there is provided a control method of a legged robot that performs motion by changing a joint angle, which includes calculating a center-of-gravity trajectory in designated stepping motion from the stepping motion including at least one of walking motion, running motion and stopping motion, generating a center-of-gravity trajectory by superimposing a designated travel velocity onto a travel velocity of a center of gravity in the calculated center-of-gravity trajectory in stepping motion, storing the generated center-of-gravity trajectory and update all the stored center-of-gravity trajectories so as to be continuous, calculating time-varying data of a target value of the joint angle based on the updated center-of-gravity trajectory, and rotating a joint of the legged robot based on the calculated time-varying data of a target value of the joint angle.

Calculating the trajectory (the center of gravity position and the leg tip position and posture) in stepping motion in this way enables easy creation of a model of stable trajectory data, and superimposing a travel velocity onto the calculated stepping trajectory to deform it enables generation of a desired one-step trajectory according to the travel velocity. It is thereby possible to flexibly generate various motion patterns.

The control method of a legged robot may generate the center-of-gravity trajectory by acquiring a designated portion of the calculated center-of-gravity trajectory in stepping motion and superimposing the designated travel velocity onto a travel velocity of a center of gravity in the acquired trajectory. By acquiring and deforming a designated portion of the stepping trajectory, it is possible to flexibly generate trajectory data for a desired unit.

Further, the designated portion of the stepping trajectory may be a one-step trajectory of the legged robot. By acquiring and deforming the designated portion of the stepping trajectory, it is possible to flexibly generate desired trajectory data for the next one step.

Each motion included in the stepping motion may contain data such as a target ZMP trajectory, a period of motion, a sequence of lifting a foot and a grounding position of a foot tip.

According to the embodiments of the present invention described above, it is possible to provide a legged robot and its control method capable of generating various motion patterns flexibly.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIGS. 7A to 7C are views showing the outline of the motion of the legged robot according to an embodiment of the present invention; and FIGS. 8A to 8C are views showing the outline of the motion of a legged robot according to a related art.

DETAILED DESCRIPTION OF THE PREFERRED EMBODIMENTS

First Embodiment

A legged robot according to a first embodiment of the present invention first calculates a trajectory of the center of gravity in designated stepping motion. Next, it acquires a designated portion of the calculated stepping trajectory. Then, it superimposes a travel velocity onto the acquired trajectory portion to deform it. Based on the deformed trajectory of the center of gravity, the legged robot performs motion by changing the joint angle.

Figure 1:
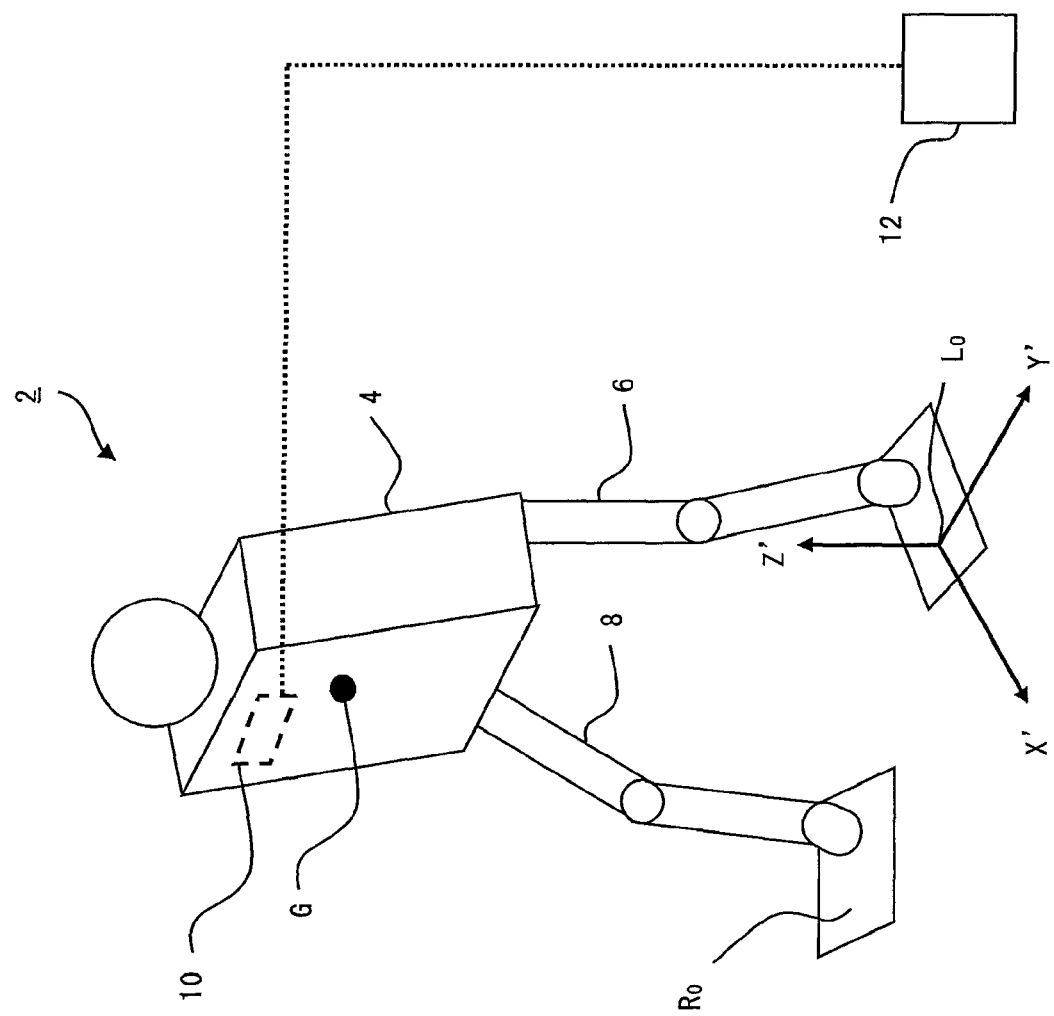
FIG. 1 is a schematic diagram showing the legged robot according to an embodiment of the present invention.

A trajectory calculation method of a robot according to the first embodiment of the present invention is described hereinafter with reference to the drawings. FIG. 1 is a view showing the outline of the legged robot according to the first embodiment. A robot 2 includes a trunk 4, a left leg link 6, a right leg link 8, a control unit 10 and a controller 12. One end of the left leg link 6 is rotatably coupled to the trunk 4 through a hip joint. The left leg link 6 includes a knee joint and an ankle joint and further includes a foot at the end. One end of the right leg link 8 is rotatably coupled to the trunk 4 through a hip joint. The right leg link 8 includes a knee joint and an ankle joint and further includes a foot at the end. Each joint of the robot 2 has an actuator (not shown), and the actuator drives rotation according to a command from the control unit 10. At the respective centers of the feet of the left leg link 6 and the right leg link 8, reference points L0 and R0 are placed, respectively. The reference points L0 and R0 are points that are used as the reference when generating the motion pattern of the robot 2. In FIG. 1, G indicates the center of gravity position of the robot 2.

The control unit 10 is a computer device that includes CPU, ROM, RAM, hard disk and so on. The control unit 10 can communicate with the controller 12 and receives a command value from the controller 12 that is manipulated by a user. The control unit 10 generates or calculates the motion pattern of the robot 2 based on the command value that is input by a user. The control unit 10 stores the generated motion pattern and drives each joint so as to implement the stored motion pattern. The detail of the control unit 10 is described later.

In the following description, a coordinate system $(x, y, z)$ that is fixed to the floor outside the robot 2 is used as a coordinate system for describing the trajectory of the robot 2. A coordinate system that is fixed at the reference point on the robot 2 is expressed as $(x', y', z')$. In the robot 2 according to the first embodiment, the center of the foot of the support leg is the reference point with the coordinate system $(x', y', z')$ as shown in FIG. 1. In the followings, a position, a velocity, an acceleration and a trajectory that are described in the coordinate system $(x', y', z')$ that is fixed at the reference point of the robot 2 are referred to as a relative position, a relative velocity, a relative acceleration and a relative trajectory, respectively.

Figure 2:
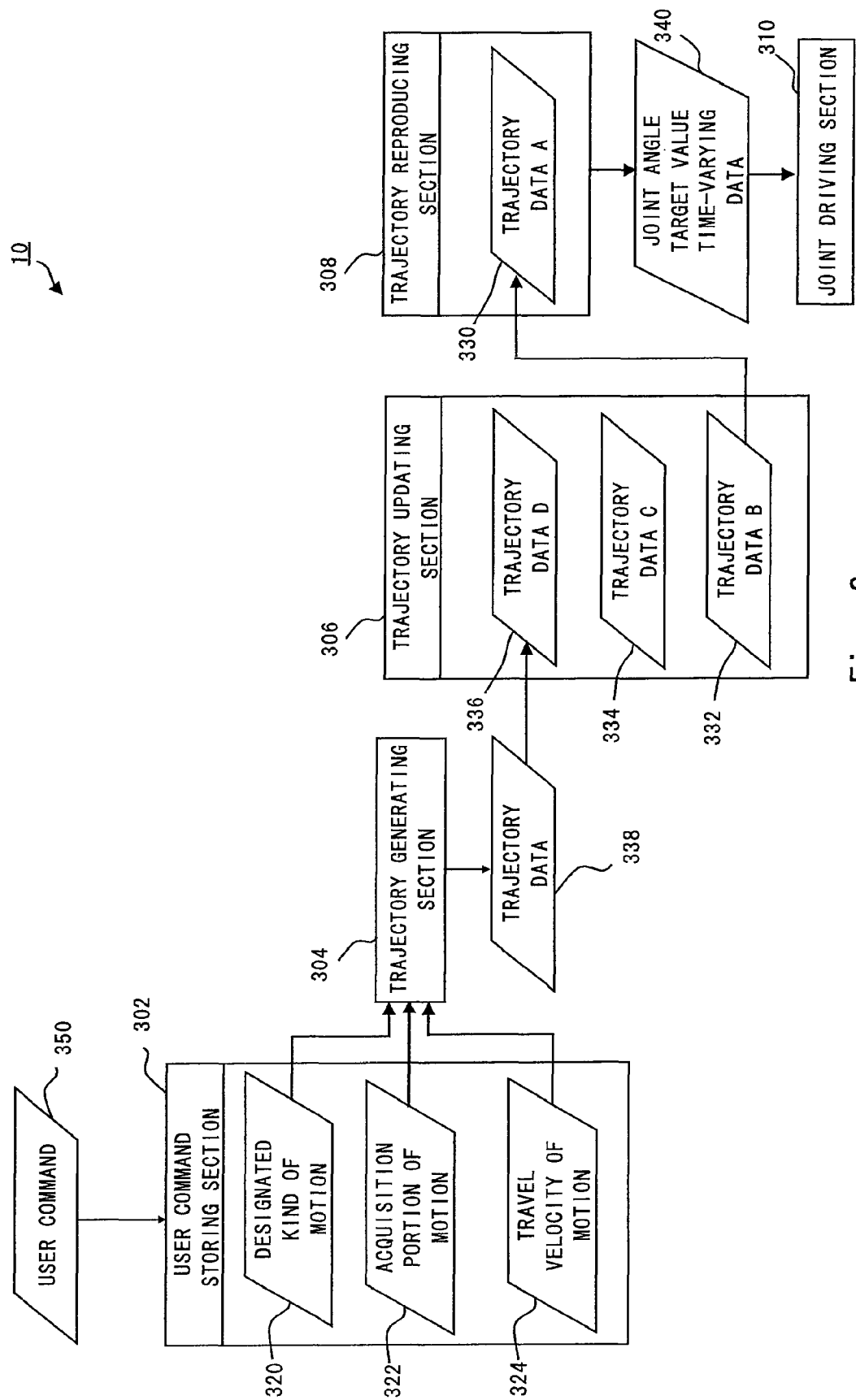
FIG. 2 is a functional block diagram showing the configuration of the legged robot according to an embodiment of the present invention.

The detail of the operation of the control unit 10 is described hereinbelow. FIG. 2 is a functional block diagram showing the functional configuration of the control unit 10. The control unit 10 includes a user command storing section 302, a trajectory generating section 304, a trajectory updating section 306, a trajectory reproducing section 308 and a joint driving section 310.

The user command storing section 302 stores a user command value 350 that is input by a user. The user command storing section 302 stores data such as (1) a designated kind of motion (walking/running/stopping) 320, (2) an acquisition portion of motion (right foot/left foot/both feet) 322, (3) a travel velocity of motion 324, and so on. The detail of those data is described later.

If the new user command value 350 is input when the robot 2 is in motion, the control unit 10 rewrites the user command value that is stored in the user command storing section 302 into the newly input user command value. Because the control unit 10 sequentially calculates and generates the motion based on the data that is stored in the user command storing section 302, the new command value that is input by a user is used for generation of the subsequent motion of the robot 2. A user inputs the user command value using the controller 12 such as a joystick while viewing the movement of the robot 2, thereby controlling the motion of the robot 2 in real time.

The trajectory generating section 304 generates the trajectory of the center of gravity of the robot 2 based on the user command value stored in the user command storing section 302. Specifically, based on the kind of stepping motion that is designated by the user command value, the trajectory generating section 304 generates trajectory data of the center of gravity in the stepping motion. The trajectory generating section 304 then acquires trajectory data corresponding to a designated portion of the motion from the generated stepping trajectory data and superimposes a designated velocity onto the trajectory data. Although the trajectory of the center of gravity generated therein is described in the coordinate system $(x, y, z)$ that is fixed outside of the robot 2, because the reference point (located at the foot of the support leg) of the robot 2 does not shift with respect to the floor in the ground phase where the robot 2 is on the ground, it may be treated as data described in the coordinate system $(x', y', z')$ that is fixed at the reference point of the robot 2. The detail of the trajectory generation processing is described later.

The trajectory data 330 to 338 include data that describes the trajectory of the center of gravity in the coordinate system $(x', y', z')$ whose origin is the reference point at the tip of the support leg of the robot 2. In addition to the trajectory of the center of gravity position, the trajectory data also include time-series data of a rotational momentum about the center of gravity and a leg tip position and posture. In the trajectory data, the symbol indicating the sequence of the time interval from the start to the end of the motion of the robot 2 is associated with the relative trajectory of the center of gravity in the relevant time interval.

The trajectory updating section 306 is activated in response to a request from the trajectory reproducing section 308, which is described later. The trajectory updating section 306 stores trajectory data for a predetermined time interval and updates the stored trajectory data at regular intervals. If the number of pieces of trajectory data that are stored in the trajectory updating section 306 becomes equal to or less than a predetermined number, the trajectory updating section 306 requests the next trajectory data (the trajectory data corresponding to one step or a part of it) to the trajectory generating section 304.

Further, the trajectory updating section 306 calculates the grounding position of the tip of the swing leg of the robot 2 based on the trajectory data of the center of gravity position of the robot 2 that is calculated by the trajectory generating section 304, and calculates trajectory data related to the swing leg tip position and posture of the robot 2 based on the grounding position of the leg tip. The trajectory data of the tip of the swing leg that is calculated therein is described in the coordinate system $(x', y', z')$ whose origin is the reference point at the tip of the support leg of the robot 2.

The trajectory updating section 306 stores trajectory data corresponding to three steps, for example, as a predetermined time interval. Further, the trajectory updating section 306 updates the stored trajectory data at intervals of 10 ms, for example. The intervals at which the trajectory updating section 306 performs processing are not limited thereto, and it is preferred that the trajectory updating section 306 performs processing at relatively longer intervals than the intervals at which the trajectory reproducing section 308 performs processing.

The trajectory reproducing section 308 stores trajectory data for a predetermined time interval and supplies a joint angle target value for driving the robot 2 to the joint driving section 310 at regular intervals. The trajectory reproducing section 308 computes joint angle target value time-varying data 340 for each joint of the robot 2 based on the trajectory data. Further, if the number of pieces of trajectory data that are stored in the trajectory reproducing section 308 becomes equal to or less than a predetermined number, the trajectory reproducing section 308 requests the next trajectory data (the trajectory data corresponding to one step or a part of it) to the trajectory updating section 306.

The trajectory reproducing section 308 stores trajectory data corresponding to 10 to 50 ms, for example, as a predetermined time interval. Further, the trajectory reproducing section 308 supplies the joint angle target value to the joint driving section 310 at intervals of 2 ms, for example. The intervals at which the trajectory reproducing section 308 performs processing are not limited thereto, and it is preferred that the trajectory reproducing section 308 performs processing at relatively shorter intervals than the intervals at which the trajectory updating section 306 performs processing. For example, if the trajectory updating section 306 performs processing at intervals of 10 ms, the trajectory reproducing section 308 preferably performs processing at intervals of 1 to 5 ms.

The joint angle target value time-varying data 340 includes time-varying data of a target joint angle for each joint of the robot 2. The joint driving section 310 drives each joint of the robot 2 based on the joint angle target value time-varying data 340.

Figure 3:
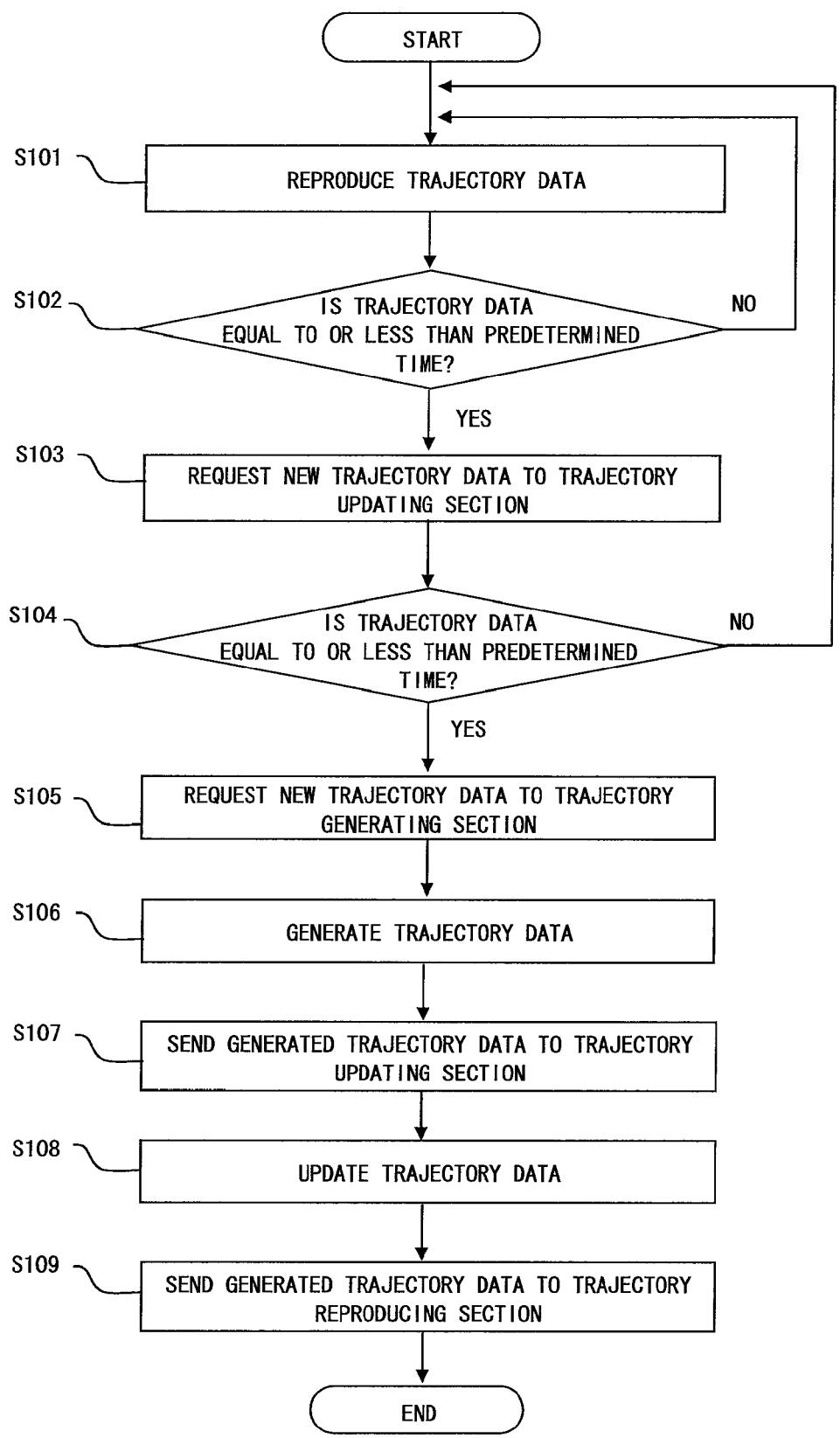
FIG. 3 is a flowchart showing the processing performed by the control unit of the legged robot according to an embodiment of the present invention.

The processing that is performed by the robot 2 according to the first embodiment is described hereinafter with reference to FIG. 3. FIG. 3 is a flowchart to describe the outline of motion generation processing. Although the processing of FIG. 3 can generate any of walking and running motion based on periodic motion, the case where it generates walking and running motion based on stepping walking motion is described hereinbelow by way of illustration.

First, in Step S101, the trajectory reproducing section 308 converts the stored trajectory data into joint angle target value time-varying data and supplies it to the joint driving section 310. The trajectory data is thereby reproduced. In this example, the trajectory reproducing section 308 is capable of storing trajectory data for about 10 ms (2 ms×5), and it acquires one trajectory data (trajectory data for a time interval of 2 ms) and supplies it to the joint driving section 310 at intervals of 2 ms. It is now assumed that the trajectory reproducing section 308 stores the trajectory data A corresponding to 6 ms, for example, and supplies the joint angle target value time-varying data to the joint driving section 310 at intervals of 2 ms. As a result of reproducing the converted trajectory data by the robot 2, the trajectory data is consumed. In the following example, trajectory data of one step that is necessary for the robot 2 to perform motion is assumed to be trajectory data corresponding to 10 ms.

Next, the trajectory reproducing section 308 determines whether the stored trajectory data is equal to or less than a predetermined time interval (Step S102). For example, it is assumed that the trajectory data A shown in FIG. 2 is in the state that trajectory data corresponding to 4 ms is already consumed, and remaining trajectory data corresponding to 6 ms exists. Because the joint angle target value time-varying data to be supplied to the joint driving section 310 becomes nonexistent after a lapse of 6 ms, the trajectory reproducing section 308 determines that the stored trajectory data is equal to or less than the predetermined time interval and requests new trajectory data to the trajectory updating section 306 (Step S103). On the other hand, if the trajectory reproducing section 308 determines that the stored trajectory data is not equal to or less than the predetermined time interval, it returns to Step S101 and continues to perform the trajectory reproduction processing. The predetermined time interval are not limited to 6 ms, and it may be appropriately determined according to the performance of a calculator placed in the robot 2 or the processing intervals of the trajectory reproducing section 308 and so on.

When the trajectory reproducing section 308 requests new trajectory data to the trajectory updating section 306, the trajectory reproducing section 308 may supply the current state of the robot 2 (e.g. the center of gravity position, the leg tip position and posture that are calculated based on a sensor, an actually measured joint angle and so on) to the trajectory updating section 306. Based on the state of the robot 2, the trajectory updating section 306 may update the top condition in the trajectory data that is stored in the trajectory updating section 306. The current state of the robot 2 can be thereby reflected on the next trajectory data to be supplied in response to a request from the trajectory reproducing section 308.

The trajectory updating section 306 is activated in response to a request from the trajectory reproducing section 308 and determines whether the stored trajectory data is equal to or less than a predetermined time interval (Step S104). In this example, the trajectory updating section 306 is capable of storing queues of trajectory data divided for each step for three steps, and, it is assumed that the trajectory data B and C are stored at the time of receiving a request from the trajectory reproducing section 308. If the trajectory data that is stored in the trajectory updating section 306 becomes less than three steps, for example, the trajectory updating section 306 determines that the stored trajectory data is equal to or less than a predetermined time interval and requests new trajectory data of one step to the trajectory generating section 304 (Step S105).

The trajectory data B is one-step trajectory data to be reproduced next in the trajectory reproducing section 308, and it is trajectory data from the landing of the left foot to the lifting of the right foot. The trajectory data C is one-step trajectory data subsequent to the trajectory data B, and it is trajectory data from the landing of the right foot to the lifting of the left foot. The trajectory data D is one-step trajectory data subsequent to the trajectory data C, and it is supplied from the trajectory generating section 304, which is described later.

On the other hand, if the trajectory updating section 306 determines that the stored trajectory data is not equal to or less than a predetermined time interval, the trajectory updating section 306 supplies the trajectory data to the trajectory reproducing section 308, and the process returns to Step S101 and continues to perform the trajectory reproduction processing. As a result of supplying the trajectory data from the trajectory updating section 306 to the trajectory reproducing section 308, the trajectory data that is stored in the trajectory updating section 306 is consumed. In order to drive the biped locomotion robot in real time, it is necessary to store the trajectory data that is equal to or longer than a predetermined time interval in the trajectory updating section 306. The predetermined time interval is not limited to three steps, and it may be appropriately determined according to the performance of a calculator placed in the robot 2 or the processing intervals of the trajectory updating section 306 and so on.

The trajectory generating section 304 is activated in response to a request from the trajectory updating section 306 and generates trajectory data based on the user command value (Step S106). Trajectory data generation processing is described later.

Then, the trajectory generating section 304 superimposes a travel velocity onto the generated trajectory data based on the user command value and supplies it to the trajectory updating section 306 (Step S107). The trajectory data on which the travel velocity is superimposed is added to the end of the trajectory data that is stored in the trajectory updating section 306.

After receiving the trajectory data from the trajectory generating section 304, the trajectory updating section 306 updates the stored trajectory data including the added trajectory data (Step S108). Specifically, the trajectory updating section 306 updates the stored trajectory data from the top to the end and supplies the trajectory data corresponding to a given time interval from the top to the trajectory reproducing section 308. If the current state of the robot 2 is supplied from the trajectory reproducing section 308 to the trajectory updating section 306 in order to reflect the current state of the robot 2, the trajectory updating section 306 may update the top condition of the top trajectory data stored in the trajectory updating section 306 and further update all the stored trajectories so as to be continuous. The trajectory update processing is performed by solving a ZMP equation using velocity boundary condition, which is described in detail later.

After being activated in Step S103, the trajectory updating section 306 performs the processing from Step S104 to Step S108 at intervals of 10 ms, for example. The processing intervals of the trajectory updating section 306 are not limited thereto, and the processing intervals of each section or the like are adjusted so that the processing is performed until all the trajectory data stored in the trajectory reproducing section 308 are consumed.

By the above-described processing, it is possible to generate motion with continuous arbitrary walking and running data. Further, because the processing of generating a new one-step trajectory can be made by solving a trinomial equation about four times in total, it is possible to execute the processing at very high speed. In this description, an equation that calculates a ZMP from three time-position coordinates discretized in unit time is referred to as the "trinomial equation obtained by discretizing a ZMP equation". The use of the trinomial equation enables calculation of the trajectory of the center of gravity which realizes the ZMP that coincides with a target ZMP.

Figure 4:
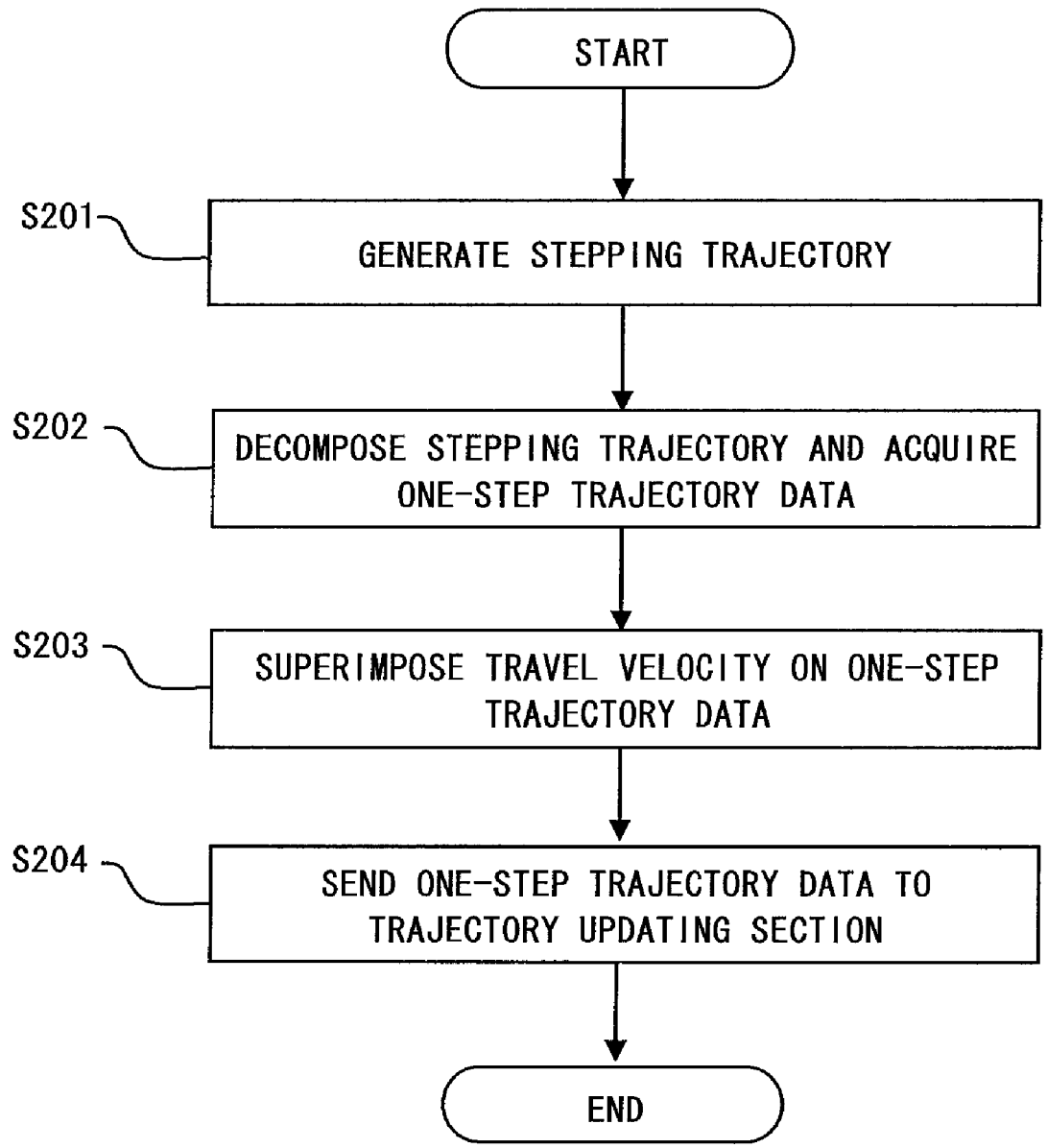
FIG. 4 is a flowchart showing the trajectory generation processing according to an embodiment of the present invention.
Figure 5A:
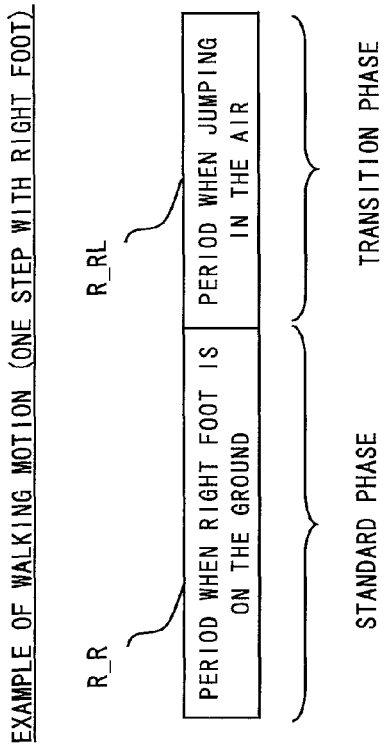
FIGS. 5A to 5C are views showing examples of trajectory data according to an embodiment of the present invention.
Figure 5B:
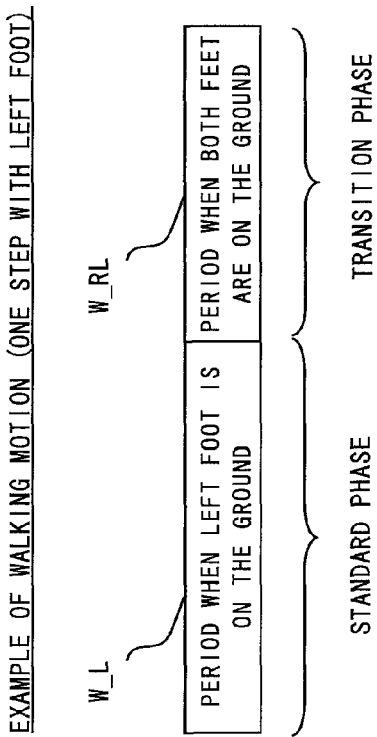
Figure 5C:
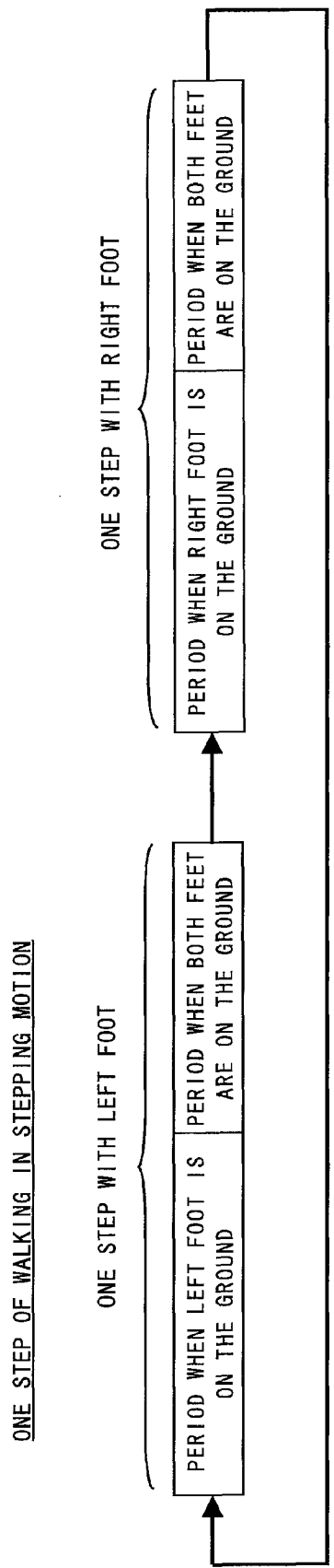

The detail of the trajectory generation processing performed by the robot 2 according to the first embodiment is described hereinafter with reference to FIGS. 4 to 6. FIG. 4 is a flowchart to describe the detail of the trajectory generation processing. FIGS. 5A to 5C are views showing one step in walking motion, one step in running motion and one step in stepping motion, respectively. FIGS. 6A to 6C are conceptual views to describe the trajectory generation processing. The processing of generating a trajectory in walking and running motion based stepping walking motion is described hereinafter by way of illustration.

The trajectory generating section 304 first calculates trajectory data of the center of gravity (the center of gravity position and the leg tip position and posture) in on-the-spot stepping motion. Next, the trajectory generating section 304 acquires a portion of the trajectory data. Then, the trajectory generating section 304 superimposes a travel velocity onto the acquired portion of the trajectory data to generate the trajectory data of the center of gravity in general walking and running motion and supplies it to the trajectory updating section 306.

Receiving a request for generating new trajectory data from the trajectory updating section 306, the trajectory generating section 304 generates a trajectory of the center of gravity in stepping motion (Step S201). The processing by the trajectory generating section 304 that generates a stepping trajectory based on a user command value is described later. According to the first embodiment, trajectory data of one step is defined as follows with regard to the trajectory that is generated in the trajectory generating section 304.

For example, in the walking pattern that lets the foot down in the order of the left foot, the right foot, the left foot, the right foot and so on, one step with the left foot indicates a motion period that begins when the left foot starts coming down to the ground and, after the both feet are on the ground, ends before the left foot comes off the ground. Referring to FIG. 5A, one step with the left foot in walking motion involves a standard phase which is a period where only the left foot is on the ground, and a transition phase which is a period where the both feet are on the ground.

On the other hand, one step with the left foot in running motion indicates a motion period that begins with landing with the left foot and, then jumping with the left foot, and ends before landing with the right foot. In order to treat the running motion as having the same data structure as the walking motion, in the case of performing the running motion, an air phase in which the both feet are in the air is treated as the transition phase in the same manner as the case of the walking motion. Referring to FIG. 5B, one step with the right foot in the running motion involves a standard phase which is a period where only the right foot is on the ground, and a transition phase which is a period where the both feet are in the air. Thus, the walking motion and the running motion are different in that the both feet are on the ground or in the air in the transition phase.

As described in the foregoing, "one-step trajectory data" that is generated by the trajectory generating section 304 can be treated as data that involves the standard phase in which either foot is on the ground and the transition phase in which both feet are on the ground or in the air.

The stable trajectory with which the robot 2 does not fall down can be regarded not as a single one-step trajectory existing independently, but as a trajectory portion acquired from a given stepping trajectory, for example. For instance, one step with the left foot shown in FIG. 5A can be regarded as a portion of the stepping trajectory shown in FIG. 5C. The stepping trajectory shown in FIG. 5C is a stepping trajectory that repeats motion that the left foot comes down to the ground so that the both feet are on the ground, the right foot then comes down to the ground so that the both feet are on the ground, the left foot again comes down to the ground so that the both feet are on the ground, and so on, and the trajectory of the portion "the left foot comes down to the ground so that the both feet are on the ground" is equivalent to the one-step trajectory of the left foot shown in FIG. 5A.

The stepping motion includes walking motion that does not involve the phase in which the feet of the robot are in the air, and running motion that involves the phase in which the feet are in the air. Further, the stepping motion includes running motion containing landing with the left foot, jumping with the left and landing with the right foot, stopping motion in which the robot stands upright, and so on. The stepping motion thus includes running, waking and stopping motion. Therefore, when the next one step is requested from the trajectory updating section 306, the trajectory generating section 304 designates either one of the running, waking and stopping motion and generates a stepping trajectory of the designated motion. The stepping trajectory is a trajectory of the center of gravity in the case of performing the stepping motion on the same spot.

In order to generate the stepping trajectory, the trajectory generating section 304 first reads a user command value from the user command storing section 302. As the user command value, parameters (1) the designated kind of motion (walking/running/stopping) 320, (2) the acquisition portion of motion (right foot/left foot/both feet) 322, (3) the travel velocity of motion 324 can be applied. In this example, (1) the designated kind of motion (walking/running/stopping) 320 is used.

The designated kind of motion 320 is the user command value that designates the kind of the stepping motion, and it designates either kind of walking, running or stopping motion. The designated kind of motion 320 contains data such as a relative ZMP trajectory, a period of motion, a sequence of lifting a foot and a grounding position of a foot tip for each motion included in the stepping motion. Those data may be arbitrarily given by a user within the range permitted by the performance and the mechanism of the robot 2.

The relative ZMP trajectory is time-varying data of the position with respect to the reference point of the foot of the support leg of a target ZMP, which may be arbitrarily given by a user. In the ground phase, if a ZMP exists within the foot of the leg link serving as the support leg, the robot 2 can continue its motion without falling down. In the robot 2 according to the first embodiment, the relative ZMP trajectory is set so that it is fixed at the center of the foot of the support leg. If such a relative ZMP trajectory is realized, the robot 2 can implement the motion stably without falling down. The relative ZMP trajectory may be any trajectory as long as it is kept within the foot. For example, the trajectory that moves from backward to forward within the foot of the support leg may be used. The robot 2 can implement the motion stably without falling down when such a relative ZMP trajectory is realized as well.

The trajectory generating section 304 calculates the relative trajectory of the center of gravity in the stepping motion. The relative trajectory of the center of gravity is determined based on a target relative ZMP trajectory under periodic boundary condition, which is described later. The relative trajectory of the center of gravity is calculated so that the actual relative ZMP trajectory when the relative trajectory of the center of gravity is realized coincides with the target relative ZMP trajectory.

The calculation of the relative trajectory of the center of gravity is described hereinbelow. The relative ZMP position $(q_{x'}, q_{y'})$ that is realized by the robot 2 can be calculated from the relative center-of-gravity position (x', y', z') of the robot 2 and the angular momentum $(r_{x'}, r_{y'})$ about the center of gravity of the robot 2. The following expression that calculates the actually generated ZMP from the relative center-of-gravity position of the robot 2 and the angular momentum about the center of gravity of the robot 2 is called the ZMP equation.

$$q_{x'} = \frac{m(z'^{(2)} + g)x' - mx'^{(2)}z' - r_{y'}^{(1)}}{m(z'^{(2)} + g)} \quad \text{[Expression 1]}$$

$$q_{y'} = \frac{m(z'^{(2)} + g)y' - my'^{(2)}z' + r_{x'}^{(1)}}{m(z'^{(2)} + g)}$$

In the above expression, $^{(1)}$ indicates first-order differentiation with respect to time t, and $^{(2)}$ indicates second-order differentiation with respect to time t. Further, m indicates the mass of the robot 2, and g indicates the gravitational acceleration. In the above expression, z' and z'$^{(2)}$ are the vertical position and the vertical acceleration of the center of gravity with respect to the origin at the tip of the support leg of the robot. In the motion of the robot 2 according to the first embodiment, z' is set to a fixed value and z'$^{(2)}$ is set to 0, assuming that the height of the center of gravity is constant and the mass does not change in the z' direction. In the above expression, $r_{x'}^{(1)}$ and $r_{y'}^{(1)}$ indicate the effect of a change in the angular momentum about the center of gravity. In the first embodiment, the angular momentum $(r_{x'}, r_{y'})$ is assumed to be 0 throughout the motion.

Discretizing the ZMP equation of Expression 1 derives the expression for obtaining the time-varying data of the horizontal center-of-gravity position (x', y'). The discretization is performed using the unit time Δt with respect to the time t. For example, for the x'-direction trajectory of the center of gravity, the following trinomial equation is obtained.

$$q_{x'i} = a_i x'_{i-1} + b_i x'_i + c_i x'_{i+1} \quad \text{[Expression 2]}$$

In the above expression, $x'_i$ and $q_{x'i}$ are variables obtained by discretizing the x'-direction center-of-gravity trajectory x'(t) and the relative x'-direction ZMP trajectory $q_{x'}(t)$, respectively. Further, i indicates the sequence of time divided by unit time. The above Expression 2 shows that the x' direction coordinate $q_{x'i}$ of the ZMP at the time i can be calculated from the immediately preceding x' direction coordinate $x'_{i-1}$, the x' direction coordinate $x'_i$ at that time and the immediately following x' direction coordinate $x'_{i+1}$. The coefficients $a_i$, $b_i$ and $c_i$ are coefficients that are calculated by the following expression:

$$a_i = c_i = -\frac{z'_i}{(z'^{(2)})_i + g)\Delta t^2} \quad \text{[Expression 3]}$$

$$b_i = 1 - 2a_i$$

In the above expression, Δt indicates a time width used for discretization of the ZMP equation, and $z'_i$ and $z'^{(2)}_i$ are variables obtained by discretizing the vertical position and the acceleration of the center of gravity, respectively. In this embodiment, Δt is a time width obtained by dividing the time from the start to the end of motion into n equal parts.

The on-the-spot stepping motion of the robot 2 begins with an upright posture, then lifts the right foot once and lets it down to the floor keeping a balance, further lifts the left foot once and then lets it down to the floor keeping a balance, and finally returns to the upright posture. In other words, it is the motion that drives the legs of the robot 2 alternately from the upright posture, thereby supporting the center of gravity. With regard to the on-the-spot stepping motion, which is such a periodic motion, the relative trajectory of the center of gravity for implementing the motion can be determined uniquely. Specifically, by adding periodic boundary condition for performing periodic motion (the condition that the center of gravity position of the robot 2 is circulated at the start and the end of the motion), a unique relative center-of-gravity trajectory for implementing the on-the-spot stepping motion can be obtained.

Summarizing the above-described relationship, eventually, the x'-direction center-of-gravity trajectory ($x'_1$, $x'_2$, ..., $x'_n$), by which the realized relative ZMP trajectory coincides with the target relative ZMP trajectory, can be obtained by solving the equation represented by the following matrix. Under the periodic boundary condition, the following matrix can be formed by a circulant matrix in which the periodic boundary condition is applied to a tridiagonal matrix.

$$\begin{bmatrix} b_1 & c_1 & 0 & 0 & & & 0 & a_1 \\ a_2 & b_2 & c_2 & 0 & & & 0 & 0 \\ 0 & a_3 & b_3 & c_3 & & & & \\ & & & \ddots & & & & \\ & & & & \ddots & & & \\ & & & & a_{n-2} & b_{n-2} & c_{n-2} & 0 \\ 0 & 0 & & 0 & a_{n-1} & b_{n-1} & c_{n-1} \\ c_n & 0 & & 0 & 0 & a_n & b_n \end{bmatrix} \begin{bmatrix} x'_1 \\ x'_2 \\ x'_3 \\ \vdots \\ \vdots \\ x'_{n-2} \\ x'_{n-1} \\ x'_n \end{bmatrix} = \quad \text{[Expression 4]}$$

$$\begin{bmatrix} q_{x'1} \\ q_{x'2} \\ q_{x'3} \\ \vdots \\ \vdots \\ q_{x'n-2} \\ q_{x'n-1} \\ q_{x'n} \end{bmatrix}$$

In the above Expression 4, the left side is expressed by the product of a matrix and a column vector, and the matrix contains a coefficient calculated by the vertical element of the center of gravity. In the stepping motion of the robot 2 according to the first embodiment, the matrix is a circulant matrix in which the periodic boundary condition is applied to the tridiagonal matrix. The periodic boundary condition is condition in which the center of gravity position of the robot 2 is circulated at the start and the end of the motion by setting the n-th column in the first row to a coefficient $a_1$, and the first column in the n-th row to a coefficient $c_n$. The tridiagonal matrix is a matrix in which the diagonal elements and the subdiagonal elements adjacent thereto have significant values, and the other elements are 0. In other words, under the periodic boundary condition, with regard to the simultaneous equations represented by the above Expression 4, the elements of the coefficient matrix are arranged so that the equation related to the first element in the column of target ZMP contains the last element in the column of trajectory of the center of gravity, and the equation related to the last element in the column of target ZMP contains the first element in the column of trajectory of the center of gravity. The column vector on the left side indicates the x'-direction trajectory $(x'_1, x'_2, \ldots, x'_n)$ of the center of gravity. The column vector on the right side indicates the target relative ZMP trajectory.

In the above Expression 4, unknowns $(x'_1, x'_2, \ldots, x'_n)$ can be obtained by calculating the inverse matrix of the circulant matrix on the left side and further calculating the product of the inverse matrix and the right side. The x'-direction trajectory of the center of gravity can be thereby obtained. With the above-described calculations, it is possible to directly calculate the relative trajectory of the center of gravity that satisfies the target relative ZMP trajectory without the need to calculate the relative trajectory of the center of gravity by trial and error. The above-described calculations can be made with a small amount of calculations, so that the trajectory generating section 304 can perform calculations at high speed. In the case of setting the discretization number related to the trajectory of the center of gravity to n, the amount of calculations is 0 (n), and it is possible to obtain a solution at very high speed. The trajectory generating section 304 calculates the relative trajectory of the center of gravity in such a way that the actual relative ZMP trajectory when realizing the relative trajectory of the center of gravity coincides with the target relative ZMP trajectory.

The y'-direction trajectory $(y'_1, y'_2, \ldots, y'_n)$ of the center of gravity can be calculated from the relative y'-direction ZMP position $(q_{y'1}, q_{y'2}, \ldots, q_{y'n})$ under the periodic boundary condition, just like the x'-direction trajectory $(x'_1, x'_2, \ldots, x'_n)$ of the center of gravity.

By performing the above-described processing, the trajectory generating section 304 can generate the trajectory of the center of gravity in the stepping motion. By realizing the trajectory of the center of gravity that is generated by the above processing, the robot 2 can implement the on-the-spot stepping motion with the ZMP maintained within the foot of the support leg.

Referring back to FIG. 4, the trajectory generating section 304 then decomposes the stepping trajectory into a one-step trajectory that is designated by the user command value and acquires the one-step trajectory (Step S202).

In order to decompose the stepping trajectory and acquire one-step trajectory data, the trajectory generating section 304 first reads the user command value from the user command storing section 302. As the user command value, (2) the acquisition portion of motion (right foot/left foot/both feet) 322 is used. The acquisition portion of motion 322 is the user command value that designates a one-step portion of the stepping trajectory to be acquired, which designates any of acquisition portions of a right foot, a left foot and both feet.

For example, in the case of keeping the walking motion, the stepping motion including the walking motion is designated and a one-step trajectory in the walking motion is acquired from the generated step trajectory. The state of the stepping trajectory includes the state of being supported by the right foot, the state of being supported by the left foot, and the state of being supported by the both feet, and it is designated which state is needed. For example, if one step with the left foot is needed, a portion of the stepping trajectory corresponding to the one step with the left foot is acquired.

Then, the trajectory generating section 304 superimposes a travel velocity onto the acquired one-step trajectory data (Step S203). By adding the travel velocity to the condition at the end of the one-step trajectory data and performing the update processing in the trajectory updating section 306 as described later, it is possible to obtain trajectory data that satisfies desired travel velocity and travel direction.

In order to superimpose the travel velocity, the trajectory generating section 304 reads the user command value from the user command storing section 302. As the user command value, (3) the travel velocity of motion 324 is used. The travel velocity of motion 324 is the user command value that designates the travel velocity for the one-step trajectory data. Because the one-step trajectory that is generated by the trajectory generating section 304 is the trajectory in the on-the-spot stepping motion, the travel velocity is 0. Thus, in the case of designating the forward travel speed to 3 km per hour, for example, with regard to the next one-step trajectory data, the trajectory generating section 304 designates and adds the forward velocity 3 km per hour and supplies it to the trajectory updating section 306.

After that, the trajectory generating section 304 supplies the one-step trajectory data on which the travel velocity is superimposed to the trajectory updating section 306 (Step S204).

By the above processing, the one-step trajectory data to be supplied to the trajectory updating section 306 is generated. The one-step trajectory data that is generated by the trajectory generating section 304 has the unique center-of-gravity trajectory and boundary condition that satisfy the designated periodic motion (e.g. the stepping motion). As described later, the trajectory updating section 306 updates the one-step trajectory data and supplies it to the trajectory reproducing section 308, thereby implementing the desired walking and running motion.

A method that the trajectory updating section 306 updates one-step trajectory data in the case where the one-step trajectory data generated and acquired by the trajectory generating section 304 is supplied to the trajectory updating section 306 is described herein below. The designated travel velocity V is added to the end of the one-step trajectory data that is generated by the trajectory generating section 304. At the time when the stepping trajectory is generated and the one-step trajectory is acquired by the trajectory generating section 304, the travel velocity v of the center of gravity already exists in the one-step trajectory data. The travel velocity V that is designated by the trajectory generating section 304 is added to the travel velocity v, and the one-step trajectory is calculated again using the travel velocity (v+V) after the addition in the trajectory updating section 306.

The trajectory update processing is described in detail hereinbelow. In the robot 2 according to the second embodiment, the motion of the robot 2 is calculated in such a way that the trajectory of the center of gravity changes smoothly with regard to the trajectory data of a plurality of number of steps that are stored in the trajectory updating section 306. By calculating the motion in this way, the center of gravity position of the robot 2 makes smooth transition even when the robot 2 changes the support leg, so that the robot 2 achieves the stable motion. The x'-direction velocity $v_{x'1}$ of the center of gravity at the start of the one-step trajectory data that is generated by the trajectory generating section 304 is represented by the following expression using the divided time width $\Delta t$ and the positions $x'_1$ and $x'_2$ of the center of gravity.

$$v_{x'1}\Delta t = x'_2 - x'_1 \quad \text{[Expression 5]}$$

Likewise, the x'-direction velocity $v_{x'n}$ of the center of gravity at the end of the one-step trajectory data that is generated by the trajectory generating section 304 has the following relationship with the divided time width $\Delta t$ and the positions $x'_{n-1}$ and $x'_n$ of the center of gravity.

$$v_{x'n}\Delta t = x'_n - x'_{n-1} \quad \text{[Expression 6]}$$

The x'-direction velocity $v_{x'1}$ of the center of gravity at the start of the one-step trajectory data that is generated by the trajectory generating section 304 can be calculated from the trajectory data that is already stored in the trajectory updating section 306. The x'-direction velocity $v_{x'n}$ of the center of gravity at the end of the one-step trajectory data that is generated by the trajectory generating section 304 is set to $v_{x'n} = v + V$.

Summarizing the above-described relationship, eventually, the x'-direction trajectory $(x'_1, x'_2, \ldots, x'_n)$ of the center of gravity in the walking motion, by which the realized relative ZMP trajectory coincides with the target relative ZMP trajectory, can be obtained by solving the equation represented by the following tridiagonal matrix.

$$\begin{bmatrix} -1 & 1 & 0 & 0 & & & & \\ a_2 & b_2 & c_2 & 0 & & 0 & & \\ 0 & a_3 & b_3 & c_3 & & & & \\ & & & \ddots & & & & \\ & & & & \ddots & & & \\ 0 & & & & a_{n-2} & b_{n-2} & c_{n-2} & 0 \\ & & & & 0 & a_{n-1} & b_{n-1} & c_{n-1} \\ & & & & 0 & 0 & -1 & 1 \end{bmatrix} \begin{bmatrix} x'_1 \\ x'_2 \\ x'_3 \\ \vdots \\ \vdots \\ x'_{n-2} \\ x'_{n-1} \\ x'_n \end{bmatrix} = \begin{bmatrix} v_{x'1}\Delta t \\ p_{x'2} \\ p_{x'3} \\ \vdots \\ \vdots \\ p_{x'n-2} \\ p_{x'n-1} \\ v_{x'n}\Delta t \end{bmatrix} \quad \text{[Expression 7]}$$

In the above Expression 7, the left side is expressed by the product of a matrix and a column vector, and the matrix is a tridiagonal matrix that contains a coefficient calculated by the vertical trajectory of the center of gravity. The tridiagonal matrix is a matrix in which the diagonal elements and the subdiagonal elements adjacent thereto have significant values, and the other elements are 0. The column vector on the left side indicates the x'-direction trajectory $(x'_1, x'_2, \ldots, x'_n)$ of the center of gravity. The column vector on the right side involves the target relative ZMP trajectory, the value $v_{x'1}\Delta t$ that is obtained by multiplying the unit time $\Delta t$ by the x'-direction velocity $v_{x'1}$ of the center of gravity at the start to convert it into a distance, and the value $v_{x'n}\Delta t$ that is obtained by multiplying the unit time $\Delta t$ by the x'-direction velocity $v_{x'n}$ of the center of gravity at the end to convert it into a distance.

In the above Expression 7, unknowns $(x'_1, x'_2, \ldots, x'_n)$ can be obtained by calculating the inverse matrix of the tridiagonal matrix on the left side and further calculating the product of the inverse matrix and the right side. The x'-direction trajectory of the center of gravity can be thereby obtained. With the above-described calculations, it is possible to directly calculate the relative trajectory of the center of gravity that satisfies the target relative ZMP trajectory without the need to calculate the relative trajectory of the center of gravity by trial and error. The above-described calculations can be made with a small amount of calculations, so that the trajectory updating section 306 can perform calculations at high speed.

The y'-direction trajectory $(y'_1, y'_2, \ldots, y'_n)$ of the center of gravity can be calculated just like the x'-direction trajectory $(x'_1, x'_2, \ldots, x'_n)$ of the center of gravity.

As described in the foregoing, in the robot 2 according to the first embodiment, a trajectory of the center of gravity in designated stepping motion is calculated first. Next, a designated trajectory corresponding to one step is acquired out of the calculated stepping trajectory. Then, a travel velocity is superimposed onto the acquired trajectory corresponding to one step, thereby generating an arbitrary one-step trajectory. Based on the one-step trajectory that is generated in this way, the robot 2 performs motion by changing the joint angle.

In this manner, in the robot 2 according to the first embodiment, it is possible to obtain the trajectory of the center of gravity that completely satisfies ZMP condition by superimposing a desired travel velocity when calculating a stepping trajectory. Specifically, the landing positions of the foot that is calculated based on the obtained trajectory of the center of gravity reflects the travel velocity that is designated for the existing stepping trajectory, so that the ZMP position is an optimum landing position. Further, such a technique enables generation of an optimum landing position for achieving the designated travel velocity without designating the landing position of the foot.

Figures 6A, 6B, 6C:
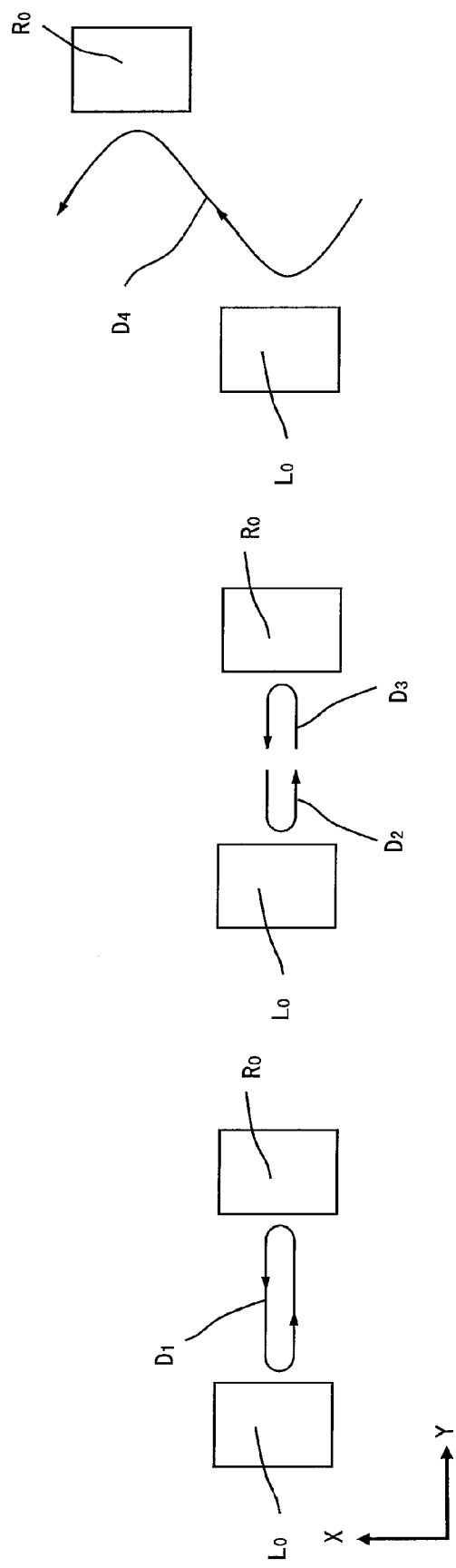
FIGS. 6A to 6C are conceptual views showing the trajectory generation processing according to an embodiment of the present invention.

FIGS. 6A to 6C are conceptual views showing the trajectory generation processing according to the first embodiment. FIGS. 6A to 6C are top views showing the feet of the robot 2. At the respective centers of the feet of the robot 2, reference points L0 and R0 are placed. The reference points L0 and R0 are points that are used as the reference when generating the motion pattern of the robot 2. First, the trajectory generating section 304 generates a trajectory of the center of gravity in the on-the-spot stepping motion. As a result, the center-of-gravity trajectory D1 in the stepping motion that moves periodically swinging from side to side is obtained as shown in FIG. 6A. Next, the trajectory generating section 304 decomposes the obtained stepping trajectory data and thereby obtains the trajectory data D2 and D3 as shown in FIG. 6B, for example. Then, the trajectory generating section 304 acquires desired trajectory data and adds a travel speed thereto, and the trajectory updating section 306 updates the trajectory data according to the travel speed. Consequently, the trajectory D4 according to the designated travel speed and direction is obtained as shown in FIG. 6C, for example. The landing position of the robot 2 can be determined based on the obtained trajectory.

Further, in the robot 2 according to the first embodiment, the configuration related to the trajectory generation processing is flexible, and it is possible to obtain the most stable grounding position of the foot easily. Specifically, in robot 2 according to the first embodiment, motion input to the robot 2 can be made by abstraction from the grounding position of the foot to the travel velocity. This eliminates the need to designate the grounding position of the foot, which simplifies the motion command to thereby allow the configuration related to the trajectory generation processing to be flexible.

According to the related art, it has been difficult to calculate a newly generated trajectory so that it is continuous with the previous trajectory about the center of gravity position and the velocity because the grounding position of the foot is designated in advance. The related art obtains an approximate solution of a continuous trajectory using the method of least square, which has a risk that the obtained trajectory is unrealizable when the trajectory of the center of gravity changes abruptly.

Differences in advantage between the related art and the embodiment of the present invention are described hereinafter with reference to FIGS. 7A to 7C and FIGS. 8A to 8C. FIGS. 7A to 7C and FIGS. 8A to 8C are views showing examples of the motion of the robot 2 in the case of operating the robot 2 by user manipulation using a joystick, for example.

FIGS. 8A to 8C are views to describe the outline of the motion of the legged robot according to the related art. FIGS. 8A to 8C are top views showing the feet of the robot 2. At the respective centers of the feet of the robot 2, the reference points L0 and R0 are placed. The reference points L0 and R0 are points that are used as the reference when generating the motion pattern of the robot 2. The outline arrow indicates the command direction and velocity to the robot 2. In the case where the command direction and velocity indicated by the outline arrow FR is directed to the robot 2 by a user as shown in FIG. 8A, the robot 2 generates the trajectory of the center of gravity, estimating the landing positions of a plurality of steps including the next first step as shown in FIG. 8B. In FIG. 8B, the trajectory of the center of gravity is generated by estimating the landing positions of the first step, the second step and the third step.

Assume the case that the command speed is changed after generating the trajectory of the center of gravity by estimating the landing positions shown in FIG. 8B. In the case where the command direction and velocity indicated by the outline arrow BR is directed to the robot 2 by a user as shown in FIG. 8C, it is necessary in the related art to calculate a target landing position that is empirically expected to be realizable based on information about the command value up to the present. Specifically, if the travel velocity and direction by which the foot position changes backward are directed as indicated by the outline arrow BR, it is not continuous with the trajectory of the center of gravity that has been generated previously. Therefore, it is unknown what landing position should be given in order to generate the realizable trajectory with the command value only. Accordingly, in such a case, a target landing position that is empirically expected to be realizable is calculated. It is thus necessary to empirically estimate the landing positions of the second step, the third step and the fourth step in FIG. 8C, and it is unable to generate a new trajectory of the center of gravity flexibly according to a change in command based on those landing positions.

On the other hand, in the robot 2 according to the first embodiment, it is possible to update trajectory data by designating the travel velocity and direction without designating the landing position of the foot. This is because, when updating trajectory data, a one-step trajectory in the on-the-spot stepping trajectory is calculated by solving the ZMP equation under velocity condition based on a designated velocity. Specifically, first, the trajectory generating section 304 generates a stepping trajectory under periodic boundary condition with regard to the existing stepping motion. Next, the trajectory updating section 306 updates a one-step trajectory in the generated stepping trajectory under designated velocity condition, thereby generating a trajectory that reflects a designated travel speed. The landing position of the foot for the next step can be thereby calculated flexibly according to a request.

FIGS. 7A to 7C are views to describe the outline of the motion of the legged robot 2 according to the first embodiment. FIGS. 7A to 7C are top views showing the feet of the robot 2. At the respective centers of the feet of the robot 2, the reference points L0 and R0 are placed. The reference points L0 and R0 are points that are used as the reference when generating the motion pattern of the robot 2. The outline arrow indicates the command direction and velocity to the robot 2. In the case where the command direction and velocity indicated by the outline arrow FR is directed to the robot 2 by a user as shown in FIG. 7A, the robot 2 generates the trajectory of the center of gravity for the next one step according to the command direction and velocity and determines its landing position as shown in FIG. 7B. In FIG. 7B, the trajectory of the center of gravity for the next one step only is generated.

Assume the case where the landing position is determined as shown in FIG. 7B and the foot is placed down as the first step. If the command velocity is changed after landing to the first step and the command direction and velocity indicated by the outline arrow BR is directed to the robot 2 by a user, the robot 2 according to the first embodiment generates a one-step trajectory that lets the foot down on the ground forward in order to realize the directed command direction and velocity. In other words, the landing position of the second step is determined as shown in FIG. 7C. When determining the third step, because the landing position of the second step is determined at the forward position, it is possible to easily determine the landing position of the third step at the backward position based on the realizable stable trajectory. Therefore, in the robot 2 according to the first embodiment, even if the directed command direction and velocity are changed, it is possible to realize the stable trajectory flexibly because the grounding position changes according to the directed command direction and velocity.

Further, in the case of operating the robot 2 by user manipulation using a joystick, for example, the next one step can be obtained in the robot 2 according to the first embodiment by designating a travel speed (by sending a request for a change in travel velocity). The robot 2 can thereby respond to a request for the next one step in real time, thereby enabling quick response. Therefore, if the robot 2 is inclined forward and the forward velocity occurs, for example, one step corresponding to the velocity can be easily obtained in the robot 2 so as to stabilize the state, which enables execution of feedback control more easily.

Furthermore, because the trajectory generation processing in the robot 2 according to the first embodiment is conducted under periodic boundary condition with regard to the stepping motion, it is possible to easily generate a trajectory that accompanies vertical movement of the center of gravity without designating velocity boundary condition in advance.

In the robot 2 according to the first embodiment, the trajectory generation processing for the next one-step trajectory and the update processing of the trajectory data stored in the trajectory updating section 306 are performed by calculating the ZMP equation, so that the amount of calculations is small, thereby executing trajectory generation at high speed.

Further, in the robot 2 according to the first embodiment, the next trajectory data is requested at the time when the trajectory data stored in the trajectory reproducing section 308 becomes equal to or less than a predetermined time interval. Receiving the request, the trajectory updating section 306 requests generation of the next trajectory at the time when the trajectory data stored in the trajectory updating section 306 becomes equal to or less than a predetermined time interval. Receiving the request, the trajectory generating section 304 generates the next one-step trajectory data. A request for generating the next one-step trajectory data can be thereby reserved until immediately before the time when the robot 2 needs the one-step trajectory data, thereby executing the trajectory generation processing in real time.

In the robot 2 according to the first embodiment, determination may be made with regard to the positional relationship of the feet. It is thereby possible to determine whether the generated trajectory is a position outside the reachable range of the foot, thereby easily avoiding generation of an unrealizable trajectory.

Other Embodiment

Although the trajectory generating section 304 generates trajectory data corresponding to one step in the first embodiment described above, the present invention is not limited thereto. For example, a portion of trajectory data corresponding to a shorter time interval than the interval corresponding to one step may be acquired.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A legged robot comprising:
   trajectory generating means to generate a center-of-gravity trajectory in stepping motion to achieve stable stepping, the stepping motion including at least one of walking motion, running motion, and stopping motion by setting a periodic boundary condition and a given target ZMP to a trinomial equation obtained by discretizing a ZMP equation, and obtain a center-of-gravity velocity in the center-of-gravity trajectory from the generated center-of-gravity trajectory in the stepping motion;
   trajectory updating means to determine a velocity condition based on the center-of-gravity velocity obtained by the trajectory generating means and a given travel velocity, and generate a center-of-gravity trajectory to achieve at least one of walking motion, running motion, and stopping motion by setting the velocity condition and the given target ZMP to the trinomial equation;
   trajectory reproducing means to calculate time-varying data of a target value of the joint angle based on the center-of-gravity trajectory generated by the trajectory updating means; and
   joint driving means to rotate the joint based on the time-varying data of the target value of the joint angle calculated by the trajectory reproducing means.

2. The legged robot according to claim 1, wherein the trajectory generating section generates the center-of-gravity trajectory by acquiring a designated portion of the calculated center-of-gravity trajectory in stepping motion and superimposing the designated travel velocity onto a travel velocity of a center of gravity in the acquired trajectory.

3. The legged robot according to claim 2, wherein the designated portion of the stepping trajectory is a one-step trajectory of the legged robot.

4. The legged robot according to claim 1, wherein each motion included in the stepping motion contains data that includes at least one of a target ZMP trajectory, a period of motion, a sequence of lifting a foot, and a grounding position of a foot tip.

5. The legged robot according to claim 1, wherein the trajectory generating section calculates a center-of-gravity trajectory in stepping motion by solving simultaneous equations established among a matrix containing a coefficient calculated based on a vertical center-of-gravity trajectory, a column of horizontal center-of-gravity trajectory, and a column of target ZMP.

6. The legged robot according to claim 5, wherein the matrix is a matrix containing the coefficient calculated based on the vertical trajectory so that an equation related to a first element in the column of target ZMP involves a last element in the column of center-of-gravity trajectory, and an equation related to a last element in the column of target ZMP involves a first element in the column of center-of-gravity trajectory.

7. The legged robot according to claim 1, wherein the trajectory updating section calculates a center-of-gravity trajectory by solving simultaneous equations established among a tridiagonal matrix containing a coefficient calculated based on a vertical center-of-gravity trajectory, a column of horizontal center-of-gravity trajectory, and a column of distance calculated from a target ZMP and a travel velocity.

8. The legged robot according to claim 1, wherein if a center-of-gravity trajectory stored in the trajectory reproducing section becomes equal to or less than a predetermined time interval, the trajectory reproducing section requests a center-of-gravity trajectory to the trajectory updating section, the trajectory updating section stores a center-of-gravity trajectory of a plurality of number of steps and, if the stored center-of-gravity trajectory becomes equal to or less than a predetermined time interval, the trajectory updating section requests generation of a center-of-gravity trajectory to the trajectory generating section, and if the trajectory generating section receives a request for generation of a center-of-gravity from the trajectory updating section, the trajectory generating section generates a center-of-gravity trajectory in stepping motion.

9. A control method of a legged robot that performs motion by changing a joint angle, comprising:
- generating a center-of-gravity trajectory in stepping motion to achieve stable stepping, the stepping motion including at least one of walking motion, running motion, and stopping motion by setting a periodic boundary condition and a given target ZMP to a trinomial equation obtained by discretizing a ZMP equation, and obtaining a center-of-gravity velocity in the center-of-gravity trajectory from the generated center-of-gravity trajectory in the stepping motion;
- determining a velocity condition based on generated the center-of-gravity velocity and given travel velocity, and generating a center-of-gravity trajectory to achieve at least one of walking motion, running motion, and stopping motion by setting the velocity condition and the given target ZMP to the trinomial equation;
- calculating time-varying data of a target value of the joint angle based on the generated center-of-gravity trajectory; and
- rotating the joint based on the calculated time-varying data of the target value of the joint angle.

10. The control method of the legged robot according to claim 9, comprising:
- generating the center-of-gravity trajectory by acquiring a designated portion of the calculated center-of-gravity trajectory in stepping motion and superimposing the designated travel velocity onto a travel velocity of a center of gravity in the acquired trajectory.

11. The control method of the legged robot according to claim 10, comprising: the designated portion of the stepping trajectory is a one-step trajectory of the legged robot.

12. The control method of the legged robot according to claim 9, comprising: each motion included in the stepping motion contains data that includes at least one of a target ZMP trajectory, a period of motion, a sequence of lifting a foot, and a grounding position of a foot tip.

* * * * *